United States Patent
Teboulle et al.

(10) Patent No.: US 11,804,972 B2
(45) Date of Patent: Oct. 31, 2023

(54) FLUID METER COMMUNICATING WITH AN ELECTROMECHANICAL VALVE

(71) Applicant: SAGEMCOM ENERGY & TELECOM SAS, Rueil Malmaison (FR)

(72) Inventors: Henri Teboulle, Rueil Malmaison (FR); Jean-Paul Lecappon, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 247 days.

(21) Appl. No.: 17/061,328

(22) Filed: Oct. 1, 2020

(65) Prior Publication Data
US 2021/0111909 A1    Apr. 15, 2021

(30) Foreign Application Priority Data
Oct. 15, 2019   (FR) ........................................ 1911488

(51) Int. Cl.
*H04L 29/06*      (2006.01)
*H04L 9/38*      (2006.01)
(Continued)

(52) U.S. Cl.
CPC .................. *H04L 9/38* (2013.01); *E03B 7/07* (2013.01); *H04L 9/0631* (2013.01);
(Continued)

(58) Field of Classification Search
CPC ....... H04L 9/38; H04L 9/0631; H04L 9/0637; H04L 9/32; E03B 7/07; H04Q 9/00;
(Continued)

(56) References Cited

U.S. PATENT DOCUMENTS

| | | | |
|---|---|---|---|
| 10,716,192 B1 * | 7/2020 | Tsibulevskiy | ........... H02J 7/342 |
| 11,394,247 B1 * | 7/2022 | Tsibulevskiy | ............. H02J 7/06 |

(Continued)

FOREIGN PATENT DOCUMENTS

CN          207008795 U     2/2018

OTHER PUBLICATIONS

So; "Zero-Configuration Identity-Based Signcryption Scheme for Smart Grid"; Smart Grid Communications (Smartgridcomm), 2010 First IEEE International Conference on, IEEE, Piscataway, NJ, USA, Oct. 4, 2010 (Oct. 4, 2010), pp. 321-326, XP031790245, ISBN: 978-1-4244-6510-1; * p. 325, alinea V-p. 326; (pp. 6).

(Continued)

*Primary Examiner* — Mahfuzur Rahman
(74) *Attorney, Agent, or Firm* — Muncy, Geissler, Olds & Lowe, P.C.

(57) ABSTRACT

A fluid meter includes communication means arranged to receive an external opening or closing command to open or close an electromechanical valve suitable for being included in a cut-off unit mounted in the proximity of the fluid meter, authentication means arranged to authenticate a control frame including the opening or closing command, and a first communication interface arranged to transmit both the control frame and electrical energy to a second communication interface of the cut-off unit via a wireless link. The electrical energy is suitable for electrically powering the second communication interface of the cut-off unit.

14 Claims, 3 Drawing Sheets

(51) Int. Cl.
  *E03B 7/07* (2006.01)
  *H04L 9/06* (2006.01)
  *H04L 9/32* (2006.01)
  *H04Q 9/00* (2006.01)

(52) U.S. Cl.
  CPC .............. *H04L 9/0637* (2013.01); *H04L 9/32* (2013.01); *H04Q 9/00* (2013.01); *H04Q 2209/40* (2013.01)

(58) Field of Classification Search
  CPC ........... H04Q 2209/40; H04Q 2209/43; H04Q 2209/886; H04Q 2209/60; G08C 2201/60; G08C 2201/61; G08C 17/02; Y04S 20/30
  See application file for complete search history.

(56) References Cited

U.S. PATENT DOCUMENTS

| | | | | |
|---|---|---|---|---|
| 2011/0066297 | A1* | 3/2011 | Saberi | H04Q 9/00 700/287 |
| 2011/0284777 | A1* | 11/2011 | Pitchford | F16K 31/06 251/65 |
| 2014/0110613 | A1* | 4/2014 | Pitchford | F16K 31/082 251/129.01 |
| 2014/0366641 | A1* | 12/2014 | Jedema | G01F 1/56 73/861.12 |
| 2017/0173262 | A1* | 6/2017 | Veltz | G16H 20/17 |
| 2018/0229997 | A1* | 8/2018 | Long | B67D 7/04 |
| 2022/0128388 | A1* | 4/2022 | Raduchel | G01F 1/696 |

OTHER PUBLICATIONS

Yao; "Secure smart metering based on LoRa technology"; 2018 IEEE 4th International Conference on Identity, Security, and Behavior Analysis (ISBA). IEEE, (Jan. 11, 2018), pp. 1-8, XP033329244, DOI: 10.1109/ISBA.2018.8311466; [extrait le Mar. 9, 2018] * alinea [03.4] *; (pp. 8 ).

* cited by examiner

FLUID METER COMMUNICATING WITH AN ELECTROMECHANICAL VALVE

The invention relates to the field of fluid meters, and more precisely to controlling valves that are positioned in the proximity of fluid meters for the purpose of selectively cutting off or re-establishing the supply of fluid.

BACKGROUND OF THE INVENTION

A fluid distribution network comprises ducts that are connected via fluid meters to fluid-consuming installations.

It is known to mount a cut-off unit on a duct in the proximity of a fluid meter, generally downstream from the fluid meter (i.e. on its installation side and not on its distribution network side). Such a cut-off unit conventionally includes an electromechanical valve that is controlled for the purpose of selectively cutting off or re-establishing the supply of fluid to the installation.

With a water meter, the electromechanical valve may be activated to cut off the supply, e.g. when a water leak is detected, or else when premises are expected to remain empty for a certain length of time, e.g. after a move.

In order to avoid the need for an operator to intervene each time the electromechanical valve is opened or closed, it needs to be possible to control the valve remotely.

Such remote control needs to be made secure, in order to prevent a malicious individual actuating the electromechanical valve fraudulently. Furthermore, the communication means used in the cut-off unit for acquiring a remote control signal must consume little electrical energy, since the cut-off unit is powered by one or more batteries and it needs to have a long lifetime without changing its battery(ies).

OBJECT OF THE INVENTION

An object of the invention is to transmit securely a remote opening or closing command to open or close an electromechanical valve included in a cut-off unit mounted in the proximity of a fluid meter, while limiting the electrical energy consumption of the cut-off unit.

SUMMARY OF THE INVENTION

In order to achieve this object, there is provided a fluid meter including communication means arranged to receive an external opening or closing command to open or close an electromechanical valve suitable for being included in a cut-off unit mounted in the proximity of the fluid meter, authentication means arranged to authenticate a control frame including the opening or closing command, and a first communication interface arranged to transmit both the control frame and electrical energy to a second communication interface of the cut-off unit via a wireless link, the electrical energy being suitable for electrically powering the second communication interface of the cut-off unit.

The authentication means of the fluid meter of the invention serve to authenticate the control frame, and thus to make secure the transmission of the command to open or close the electromechanical valve of the cut-off unit. The second communication interface of the cut-off unit is powered by the first communication interface of the fluid meter, such that transmitting the control frame does not increase the electricity consumption of the cut-off unit. It should be observed that transmitting the control frame and operating the electromechanical valve do not require a human to be present locally.

There is also provided a fluid meter as described above, wherein the first communication interface is arranged to write the control frame in a memory of the cut-off unit and to read an acknowledgement frame in the memory of the cut-off unit.

There is also provided a fluid meter as described above, wherein the authentication means are arranged to encrypt the control frame, at least in part.

There is also provided a fluid meter as described above, wherein the authentication means are arranged to use an encryption algorithm having a symmetrical encryption key that is stored in a memory of the fluid meter and in the memory of the cut-off unit.

There is also provided a fluid meter as described above, wherein the encryption algorithm is an advanced encryption standard (AES) encryption algorithm using the Galois counter mode (GCM) of operation.

There is also provided a fluid meter as described above, wherein the first communication interface is arranged to receive a key-change frame that might be transmitted by a mobile appliance brought into the proximity of the fluid meter, the fluid meter being arranged to decrypt the key-change frame and to replace the symmetrical encryption key stored in the memory of the fluid meter with a new symmetrical encryption key included in the key-change frame.

There is also provided a fluid meter as described above, wherein the control frame includes a current value of a control frame counter that is incremented each time a control frame is transmitted by the fluid meter to the cut-off unit.

There is also provided a cut-off unit suitable for being mounted in the proximity of a fluid meter, the cut-off unit comprising:
- an electromechanical valve;
- a memory;
- a second communication interface arranged to receive a control frame via a wireless link and to store it in the memory, the control frame including an opening or closing command to open or close the electromechanical valve, the second communication interface also being arranged to receive electrical energy transmitted via the wireless link, and to be powered thereby;
- a processor component arranged to acquire the control frame in the memory, to decrypt the control frame and extract the opening or closing command therefrom, to cause the electromechanical valve to open or close, and to write an acknowledgement frame in the memory.

There is also provided a cut-off unit as described above, wherein the processor component is to be found by default in a standby mode, and the second communication interface is arranged to produce an activation signal for activating the processor component when the second communication interface receives electrical energy.

There is also provided a cut-off unit as described above, wherein a symmetrical encryption key of an encryption algorithm is stored in the memory of the cut-off unit, the processor component being arranged to decrypt the control frame by using the symmetrical encryption key.

There is also provided a cut-off unit as described above, wherein the second communication interface is arranged to receive a key-change frame that might be transmitted by a mobile appliance brought into the proximity of the cut-off unit, the processor component being arranged to decrypt the key-change frame and to replace the symmetrical encryption key stored in the memory of the cut-off unit with a new symmetrical encryption key included in the key-change frame.

There is also provided a measurement system including a fluid meter as described above and a cut-off unit as described above.

There is also provided a transmission method for transmitting an opening or closing command to open or close an electromechanical valve included in a cut-off unit positioned in the proximity of a fluid meter, the transmission method being performed by a processor component of the fluid meter as described above, and the method comprising the steps of:

acquiring the opening or closing command;
authenticating a control frame including the opening or closing command;
causing the first communication interface to transmit both the control frame and electrical energy to a second communication interface of the cut-off unit via a wireless link, the electrical energy being suitable for electrically powering the second communication interface of the cut-off unit.

There is also provided a computer program including instructions that cause the processor component of the fluid meter as described to execute the steps of the above transmission method.

There is also provided a computer readable storage medium, having recorded thereon the above computer program.

There is also provided a key-change method performed by a processor component of a fluid meter as described above, a symmetrical encryption key being stored in a memory of the fluid meter, and the method comprising the steps of:

acquiring a key-change frame transmitted by a mobile appliance brought into the proximity of the fluid meter, the key-change frame including a new symmetrical encryption key and being encrypted using the symmetrical encryption key stored in the memory of the fluid meter;
decrypting the key-change frame;
replacing the symmetrical encryption key stored in the memory of the fluid meter with the new symmetrical encryption key.

There is also provided a computer program including instructions that cause the processor component of the fluid meter as described above to execute the steps of the key-change method as described above.

There is also provided a computer readable storage medium, having recorded thereon the computer program as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
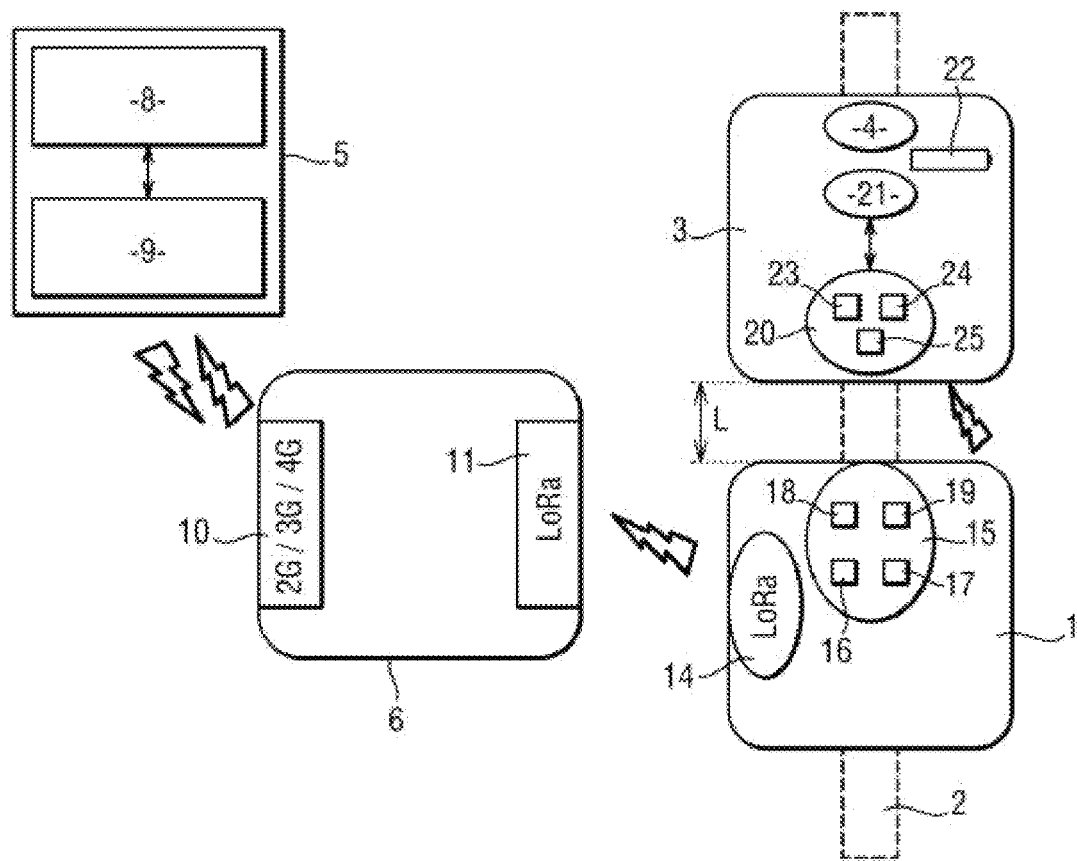
FIG. 1 shows an information system, a long range (LoRa) gateway, a water meter of the invention, and a cut-off unit.
Figure 2:
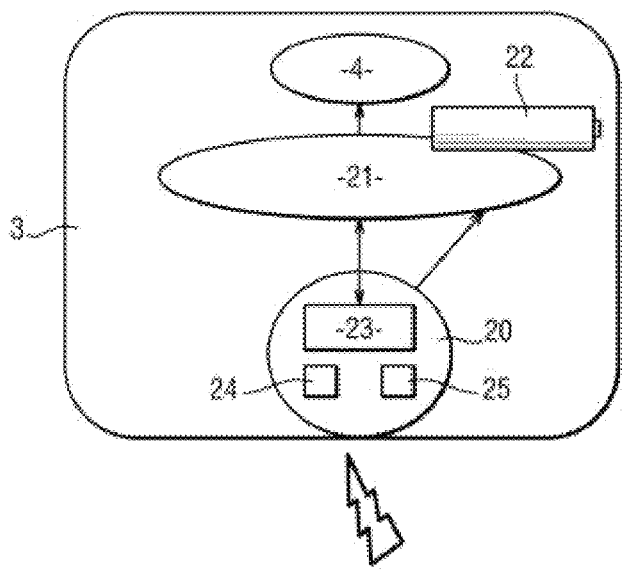
FIG. 2 shows the cut-off unit.

With reference to FIGS. 1 and 2, in this example a fluid meter of the invention comprises a water meter 1 that is mounted on a duct 2 of a water distribution network and that is used for measuring the water consumption of an installation.

A cut-off unit 3 is mounted on the duct 2 in the proximity of the water meter 1. The distance L between the water meter 1 and the cut-off unit 3 may lie in the range 1 centimeter (cm) to 10 cm, for example. The cut-off unit 3 includes an electromechanical valve 4 that is used selectively to cut off or to re-establish the supply of water to the installation.

The commands for opening or closing the electromechanical valve 4 are issued by an information system (IS) 5 that transmits the opening or closing commands to the water meter 1 via a LoRa gateway 6. The water meter 1 relays these opening or closing commands to the cut-off unit 3.

There follows a description of each of these entities.

The IS 5 comprises an application server 8 and a LoRa network server (LNS) 9. The LNS server 9 serves in particular to manage communications with all of the LoRa gateways and with all of the water meters to which the LNS server 9 is connected. In this example, the LNS server 9 communicates with the LoRa gateway 6 via a second, third, or fourth generation (2G, 3G, or 4G) network.

The LoRa gateway 6 thus comprises first communication means 10 for communicating with the LNS server 9 via a 2G, 3G, 4G network, and second communication means 11 for communicating with the water meter 1. In this example, the second communication means 11 are adapted to communicate via a long-range wide area network (LoRaWAN).

The water meter 1 includes firstly communication means 14 that are likewise adapted to communicate via a LoRaWAN network. The water meter 1 receives the commands for opening or closing the electromechanical valve 4 via the communication means 14.

The water meter 1 also includes a first communication interface 15, which in this example is a master near field communication (NFC) interface. The first communication interface 15 includes a first processor component, specifically a first microcontroller 16, a first memory 17, an NFC transceiver 18, and a first antenna 19. In this example, the NFC transceiver 18 comprises an amplifier, a modulator, and a demodulator.

The water meter 1 further includes authentication means that, in this example, comprise a programmed software module in the first microcontroller 16 and a first zone of the first memory 17.

In addition to the electromechanical valve 4, the cut-off unit 3 comprises a second communication interface 20, specifically a slave NFC interface, a second processor component, specifically a second microcontroller 21, and a battery 22.

The second communication interface 20 comprises a second memory 23, an NFC receiver 24, and a second antenna 25. By way of example, the NFC receiver 24 comprises a demodulator.

The second microcontroller 21 is arranged to control (via a driver that is not shown) opening or closing of the electromechanical valve 4. In this example, the second microcontroller 21 includes an inter-integrated circuit (I2C) interface for read and write accessing of the second memory 23.

The battery 22 of the cut-off unit 3 is used to power the second microcontroller 21 and the electromechanical valve 4 (together with the driver).

Figure 3:
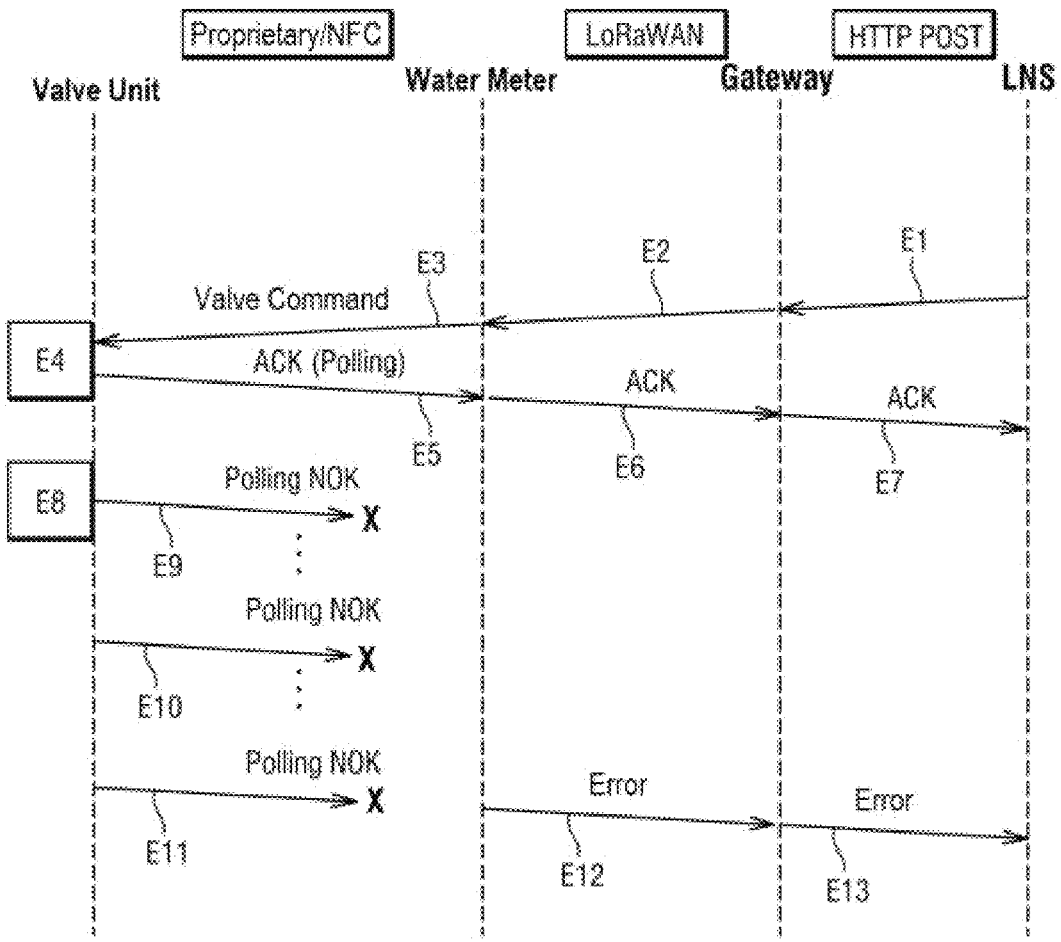
FIG. 3 shows exchanges of commands, frames, and messages between the entities of FIG. 1.

With reference to FIG. 3, there follows a description of how the above-mentioned entities co-operate.

The application server 8 produces an opening or closing command to open or close the electromechanical valve 4 of the cut-off unit 3, and the LNS server 9 transmits the opening or closing command to the LoRa gateway 6 by using a hypertext transfer protocol (HTTP) POST request (step E1). The LoRa gateway 6 relays the opening or closing command to the water meter 1 over the LoRaWAN network (step E2). The opening or closing command is made secure in accordance with the LoRa protocol.

The water meter 1 acquires the opening or closing command and decrypts it, once more in compliance with the LoRa protocol.

The first microcontroller 16 of the water meter 1 generates a control frame, which includes the opening or closing command.

The authentication means of the water meter 1 then authenticate the control frame. Authentication consists in encrypting the control frame, at least in part.

The authentication means use an encryption algorithm having a "secret" symmetrical encryption key that is stored in the first zone of the first memory 17 of the first communication interface 15.

The encryption algorithm is an AES algorithm using the GCM mode of operation. The encryption algorithm enables data to be encrypted and decrypted in 128-bit blocks. The symmetrical encryption key is a 128-bit key.

The symmetrical encryption key is also stored in a first zone of the second memory 23 of the second communication interface 20 of the cut-off unit 3, and is therefore known both to the first communication interface 15 and also to the second communication interface 20. The water meter 1 and the cut-off unit 3 are associated via this same symmetrical encryption key. By way of example, this association may be performed in the factory, once the water meter 1 and the cut-off unit 3 have been manufactured, by loading the symmetrical encryption key both into the first memory 17 of the water meter 1 and also into the second memory 23 of the cut-off unit 3. This association may also be performed during installation on site.

The water meter 1 then transmits the control frame to the cut-off unit 3 using NFC technology (step E3). By means of the NFC transceiver 18 and the first antenna 19, the first communication interface 15 produces an electromagnetic field that induces electric current in the second antenna 25 of the second communication interface 20. The electromagnetic field serves to form a wireless link enabling the first communication interface 15 to transmit the control frame to the second communication interface 20 and also to transmit electrical energy that powers the second communication interface 20. The second communication interface 20 is therefore not powered by the battery 22 of the cut-off unit 3, but only by the electrical energy transmitted via the wireless link.

In order to optimize the transmission of electrical energy, it should be observed at this point that the first antenna 19 and the second antenna 25 are advantageously positioned facing each other with each of them extending in a plane perpendicular to the axis passing through their respective centers.

The first communication interface 15 then writes the control frame in a second zone of the second memory 23 of the second communication interface 20.

By default, the second microcontroller 21 of the cut-off unit 3 is generally to be found in a standby mode. When the second communication interface 20 receives the electrical energy transmitted by the first communication interface 15, it produces an activation signal that wakes up the second microcontroller 21.

The activation signal is an interrupt signal applied to a pin of the second microcontroller 21. In a variant, it would also be possible to use a "memory busy" type signal generated by the second communication interface 20 for the purpose of waking up the second microcontroller 21.

The second microcontroller 21 then accesses the control frame by reading in the second zone of the second memory 23. Using its knowledge of the symmetrical encryption key, the second microcontroller 21 decrypts the control frame, extracts the opening or closing command from the control frame, and controls the electromechanical valve 4 as a function of said opening or closing command.

Thereafter, after opening or closing the electromechanical valve 4, the second microcontroller 21 writes an acknowledgement frame in a third zone of the second memory 23 of the second communication interface 20, the acknowledgement frame including an acknowledgement for the first communication interface 15 of the water meter 1 (step E4). It should be observed that the third zone of the second memory 23 and the second zone of the second memory 23 are possibly the same, but not necessarily.

The second microcontroller 21 authenticates the acknowledgement frame by using the above-mentioned encryption algorithm.

The first communication interface 15 accesses the third zone of the second memory 23 of the second communication interface 20 in order to attempt to read an acknowledgement frame in the third zone of the second memory 23 (step E5). Reading is performed by a polling method: at regular intervals the first communication interface 15 accesses the content of the third zone of the second memory 23 in order to determine whether an acknowledgement frame is indeed to be found in the third zone of the second memory 23.

If the acknowledgement frame is indeed present on the first read attempt, the water meter 1 itself returns an acknowledgement message to the LoRa gateway 6 (step E6). The LoRa gateway 6 relays the acknowledgement message to the application server 8 of the IS 5 via the LNS server 9 (step E7).

After the control frame has been transmitted to the cut-off unit 3, if no acknowledgement frame is stored in the third zone of the second memory 23 (step E8), then the first read attempt fails (step E9). The first communication interface 15 then makes a second read attempt (step E10). If this attempt fails, the first communication interface 15 makes a third read attempt (step E11). Each read attempt is spaced apart from the preceding read attempt by a predetermined duration, which is equal to 1 minute (min) in this example. After a predetermined number of unsuccessful read attempts, equal to 3 in this example, the water meter 1 returns an error message to the LoRa gateway 6 (step E12). The LoRa gateway 6 relays the error message to the application server 8 of the IS 5 via the LNS server 9 (step E13).

The first microcontroller 16 of the first communication interface 15 makes use of a control frame counter, and its current value is included in the control frame. The control frame counter is incremented by the first microcontroller 16 each time a control frame is transmitted by the water meter 1 to the cut-off unit 3.

This control frame counter makes it possible to avoid "playing-back" a control frame, i.e. to avoid an old control frame that has been heard and acquired by a malicious individual being used to produce an opening or closing command for fraudulently controlling the cut-off unit 3. Thus, when the second microcontroller 21 of the cut-off unit acquires a control frame, it verifies that the current value of the control frame counter, as included in that control frame, is strictly greater than the value that was included in the preceding control frame.

Likewise, the second microcontroller 21 of the cut-off unit 3 operates an acknowledgement frame counter that is incremented each time the second microcontroller 21 produces an acknowledgement frame, with the current value of that counter being included in the acknowledgement frame.

It is possible to change the symmetrical encryption key used by both the water meter 1 and the cut-off unit 3. Modifying the symmetrical encryption key is an action that is performed locally. An operator goes to the proximity of the water meter 1 and thus of the cut-off unit 3, and uses a mobile appliance, e.g. a smartphone, which has previously been provided with the symmetrical encryption key currently in force. The mobile appliance programs the new symmetrical encryption key both in the water meter 1 and in the cut-off unit 3. For this purpose, the mobile appliance sends a key-change frame, both to the water meter 1 and also, independently, to the cut-off unit 3. The new symmetrical encryption key is included in the key-change frame. The key-change frame is authenticated using the above-mentioned encryption algorithm while using the symmetrical encryption key that is currently in force.

The first microcontroller 16 of the first communication interface 15 of the water meter 1 acquires the key-change frame and stores it in a second zone of the first memory 17. The second microcontroller 21 of the cut-off unit 3 acquires the key-change frame and stores it in a fourth zone of the second memory 23.

The first microcontroller 16 and the second microcontroller 21 then use the symmetrical encryption key that is currently in force and stored in the first memory 17 and in the second memory 23 in order to decrypt the key-change frame. The first and second microcontrollers 16 and 21 then both acquire the new symmetrical encryption key and store it respectively in the first zone of the first memory 17 and in the second zone of the second memory 23.

The mobile appliance makes use of a key-change frame counter and its current value is included in the key-change frame. The key-change frame counter is incremented by the mobile appliance each time a key-change frame is transmitted by the mobile appliance to the water meter 1 and to the cut-off unit 3. The key-change frame is authenticated using the above-mentioned encryption algorithm while using the symmetrical encryption key that is currently in force.

The structures of a control frame, of an acknowledgement frame, and of a key-change frame are described below in greater detail.

Figure 4:
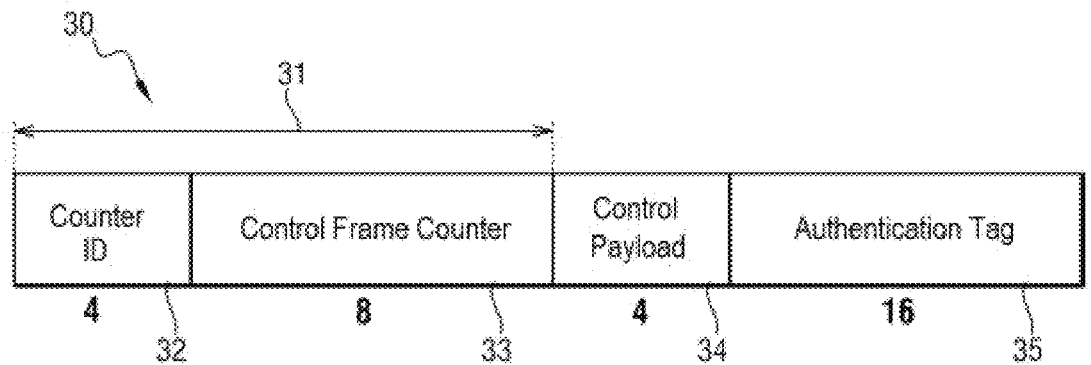
FIG. 4 shows a control frame for the electromechanical valve of the cut-off unit.

With reference to FIG. 4, a control frame 30 comprises firstly an initial value (IV) 31 that is not encrypted and that complies with the recommendation of chapter 8.2.1 of special publication 800-38 of the National Institute of Standards and Technology (NIST).

The initial value IV 31 is subdivided into a first field 32 and a second field 33.

The first field 32 is a 4-byte field that contains an identifier of the issuer of the message, specifically an identifier of the water meter 1.

The second field 33 is an 8-byte field that contains the current value of the control frame counter. The second field 33 allows for more than $18 \times 10^{18}$ commands to be issued without changing the symmetrical encryption key, and it is reinitialized to 0 each time the symmetrical encryption key is changed.

Thereafter, the control frame 30 comprises a payload 34, which is a functional field for identifying the function of the frame: opening command, closing command, or acknowledgement. The payload 34 is encrypted by the AES encryption algorithm using the GCM mode of operation, and it comprises 4 bytes.

The payload 34 has one control byte that takes the following values:
'0': for a command to open the electromechanical valve 4. This is a control frame coming from the water meter 1;
'1': for a command to close the electromechanical valve. This is a control frame coming from the water meter 1; and
'2': for an acknowledgement. This is an acknowledgement frame coming from the cut-off unit 3.

The control byte in the payload 34 of the control frame 30 thus has the value '0' for an opening command and the value '1' for a closing command.

The payload 34 also has 3 bytes that are not used.

It should be observed that the encryption algorithm used generates a 16-byte random number from the control byte.

The control frame 30 then has a 16-byte message authentication code 35 (also known as a "tag") that is generated by the AES encryption algorithm using the GCM mode of operation. The message authentication code 35 serves to authenticate the control frame 30, to ensure the integrity of the data that it contains, and to confirm that the control frame 30 does indeed come from an expected issuer (specifically from the water meter 1).

Figure 5:
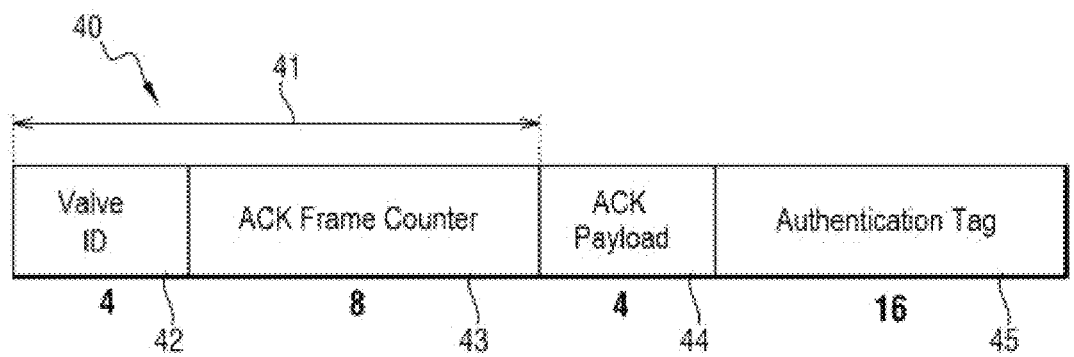
FIG. 5 shows an acknowledgement frame.

With reference to FIG. 5, an acknowledgement frame 40 comprises firstly an initial value IV 41 subdivided into a first field 42 and a second field 43.

The first field 42 is a 4-byte field that contains an identifier of the issuer of the message, specifically an identifier of the cut-off unit 3.

The second field 43 is an 8-byte field that contains the current value of the acknowledgement frame counter. The second field 43 allows for more than $18 \times 10^{18}$ acknowledgements to be issued without changing the symmetrical encryption key, and it is reinitialized to 0 each time the symmetrical encryption key is changed.

Thereafter, the acknowledgement frame 40 comprises a payload 44 encrypted by the AES encryption algorithm using the GCM mode of operation, and occupying 4 bytes.

The control byte of the payload 44 of the command frame 40 has the value '2'.

The payload 44 also has 3 bytes that are not used. It should be observed that the encryption algorithm used generates a 16-byte random number from the control byte.

The acknowledgement frame 40 then has a 16-byte message authentication code 45 (also known as a "tag") that is generated by the AES encryption algorithm using the GCM mode of operation. The message authentication code 45 serves to authenticate the acknowledgement frame 40, to ensure the integrity of the data that it contains, and to confirm that the acknowledgement frame 40 does indeed come from an expected issuer (specifically from the cut-off unit 3).

Figure 6:
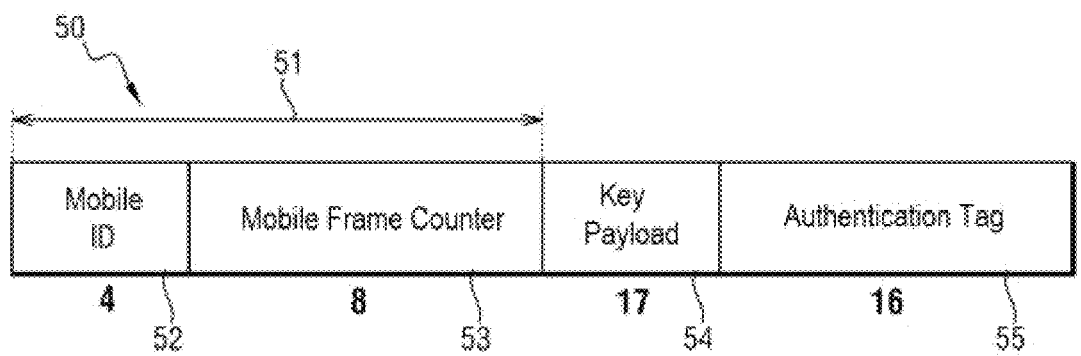
FIG. 6 shows a key-change frame.

With reference to FIG. 6, a key-change frame 50 comprises firstly an initial value IV 51 that is not encrypted and that complies with the recommendation of chapter 8.2.1 of NIST special publication 800-38.

The initial value IV 51 is subdivided into a first field 52 and a second field 53.

The first field 52 is a 4-byte field that contains an identifier of the issuer of the message. In this example, a single constant identifier is chosen for all of the mobile appliances.

The second field 53 is an 8-byte field that contains the current value of the key-change frame counter. The counter is initialized to 0 during the first change of key performed by the mobile appliance.

Thereafter, the key-change frame 50 has a payload 54 encrypted by the encryption algorithm. The payload 54 is encrypted by the key management system (KMS) using the symmetrical encryption key that is currently in force as stored in the first memory 17 of the water meter 1 and in the second memory 23 of the cut-off unit 3, and that is known to the mobile appliance.

The payload 54 comprises 17 bytes comprising a control byte having the value '3', and 16 key bytes (i.e. 128 bits).

The key-change frame 50 then has a 16-byte message authentication code 55 (also known as a "tag") that is generated by the AES encryption algorithm using the GCM mode of operation. The message authentication code 55 serves to authenticate the key-change frame 50, to ensure the integrity of the data that it contains, and to confirm that the key-change frame 50 does indeed come from an expected issuer (specifically from a mobile appliance provided for this purpose).

Naturally, the invention is not limited to the embodiment described, but covers any variant coming within the ambit of the invention as defined by the claims.

The communication technologies and protocols serving to interconnect the IS, the gateway, the fluid meter, and the cut-off unit could be different from those described above.

The first communication interface and the second communication interface need not necessarily be NFC interfaces. A technology or a protocol of some other type could be used, and for example a so-called "proprietary" technology and protocol. Any wireless link that makes it possible to transmit both data (commands, acknowledgements, etc.) and also sufficient electrical energy to power a communication interface comes within the ambit of the invention.

The invention may naturally be implemented with a meter that is not a water meter: e.g. a gas meter, an oil meter, etc.

Other encryption algorithms could be used, and for example the Twofish, Serpent, and/or Blowfish algorithms. More generally, the authentication means could be different from those described above. It is possible to use any authentication means capable of certifying the authenticity of a frame.

The first and second processor components need not necessarily be microcontrollers, they could be different components: e.g. a field programmable gate array (FPGA), an application-specific integrated circuit (ASIC), a processor, etc.

The invention claimed is:

1. A fluid meter comprising:
communication means arranged to receive an external opening or closing command to open or close an electromechanical valve included in a cut-off unit mounted in a proximity of the fluid meter;
authentication means arranged to authenticate a control frame including the opening or closing command; and
a first communication interface arranged to transmit both the control frame and electrical energy to a second communication interface of the cut-off unit via a wireless link, the electrical energy being suitable for electrically powering the second communication interface of the cut-off unit.

2. The fluid meter according to claim 1, wherein the first communication interface is arranged to write the control frame in a memory of the cut-off unit and to read an acknowledgement frame in the memory of the cut-off unit.

3. The fluid meter according to claim 1, wherein the authentication means are arranged to encrypt the control frame, at least in part.

4. The fluid meter according to claim 3, wherein the authentication means are arranged to use an encryption algorithm having a symmetrical encryption key that is stored in a memory of the fluid meter and in the memory of the cut-off unit.

5. The fluid meter according to claim 4, wherein the encryption algorithm is an advanced encryption standard (AES) encryption algorithm using a Galois counter mode (GCM) of operation.

6. The fluid meter according to claim 4, wherein the first communication interface is arranged to receive a key-change frame transmitted by a mobile appliance brought into the proximity of the fluid meter, the fluid meter being arranged to decrypt the key-change frame and to replace the symmetrical encryption key stored in the memory of the fluid meter with a new symmetrical encryption key included in the key-change frame.

7. The fluid meter according to claim 1, wherein the control frame includes a current value of a control frame counter that is incremented each time a control frame is transmitted by the fluid meter to the cut-off unit.

8. A cut-off unit suitable for being mounted in the proximity of a fluid meter, the cut-off unit comprising:
an electromechanical valve;
a memory;
a second communication interface arranged to receive a control frame via a wireless link and to store it in the memory, the control frame being transmitted by the fluid meter and including an opening or closing command to open or close the electromechanical valve, the second communication interface also being arranged to receive electrical energy transmitted BY the fluid meter via the wireless link, and to be powered thereby;
a processor component arranged to acquire the control frame in the memory, to decrypt the control frame and extract the opening or closing command therefrom, to cause the electromechanical valve to open or close, and to write an acknowledgement frame in the memory;
a symmetrical encryption key of an encryption algorithm being stored in the memory of the cut-off unit, the processor component being arranged to decrypt the control frame by using the symmetrical encryption key.

9. The cut-off unit according to claim 8, wherein the processor component is to be found by default in a standby mode, and the second communication interface is arranged to produce an activation signal for activating the processor component when the second communication interface receives electrical energy.

10. The cut-off unit according to claim 8, wherein the second communication interface is arranged to receive a key-change frame transmitted by a mobile appliance brought into the proximity of the cut-off unit, the processor component being arranged to decrypt the key-change frame and to replace the symmetrical encryption key stored in the memory of the cut-off unit with a new symmetrical encryption key included in the key-change frame.

11. A measurement system, comprising:
a cut-off unit; and
a fluid meter, comprising:
communication means arranged to receive an external opening or closing command to open or close an electromechanical valve included in a cut-off unit mounted in a proximity of the fluid meter;

authentication means arranged to authenticate a control frame including the opening or closing command; and a first communication interface arranged to transmit both the control frame and electrical energy to a second communication interface of the cut-off unit via a wireless link, the electrical energy being suitable for electrically powering the second communication interface of the cut-off unit.

12. A transmission method for transmitting an opening or closing command to open or close an electromechanical valve included in a cut-off unit positioned in the proximity of a fluid meter, the transmission method being performed by a processor component of the fluid meter, comprising communication means arranged to receive an external opening or closing command to open or close an electromechanical valve included in a cut-off unit mounted in a proximity of the fluid meter; authentication means arranged to authenticate a control frame including the opening or closing command; and a first communication interface arranged to transmit both the control frame and electrical energy to a second communication interface of the cut-off unit via a wireless link, the electrical energy being suitable for electrically powering the second communication interface of the cut-off unit, and the method comprising the steps of:

acquiring the opening or closing command;
authenticating a control frame including the opening or closing command; and
causing the first communication interface to transmit both the control frame and electrical energy to a second communication interface of the cut-off unit via a wireless link, the electrical energy being suitable for electrically powering the second communication interface of the cut-off unit.

13. The transmission method according to claim 12, further comprising:

storing a symmetrical encryption key in a memory of the fluid meter;

acquiring a key-change frame transmitted by a mobile appliance brought into the proximity of the fluid meter, the key-change frame including a new symmetrical encryption key and being encrypted using the symmetrical encryption key stored in the memory of the fluid meter;

decrypting the key-change frame; and replacing the symmetrical encryption key stored in the memory of the fluid meter with the new symmetrical encryption key.

14. A non-transitory computer readable storage medium storing instructions that execute a transmission method for transmitting an opening or closing command to open or close an electromechanical valve included in a cut-off unit positioned in the proximity of a fluid meter, the transmission method being performed by a processor component of the fluid meter, comprising communication means arranged to receive an external opening or closing command to open or close an electromechanical valve included in a cut-off unit mounted in a proximity of the fluid meter; authentication means arranged to authenticate a control frame including the opening or closing command; and a first communication interface arranged to transmit both the control frame and electrical energy to a second communication interface of the cut-off unit via a wireless link, the electrical energy being suitable for electrically powering the second communication interface of the cut-off unit, and the method comprising the steps of:

acquiring the opening or closing command;
authenticating a control frame including the opening or closing command; and
causing the first communication interface to transmit both the control frame and electrical energy to a second communication interface of the cut-off unit via a wireless link, the electrical energy being suitable for electrically powering the second communication interface of the cut-off unit.

* * * * *